UNITED STATES PATENT OFFICE.

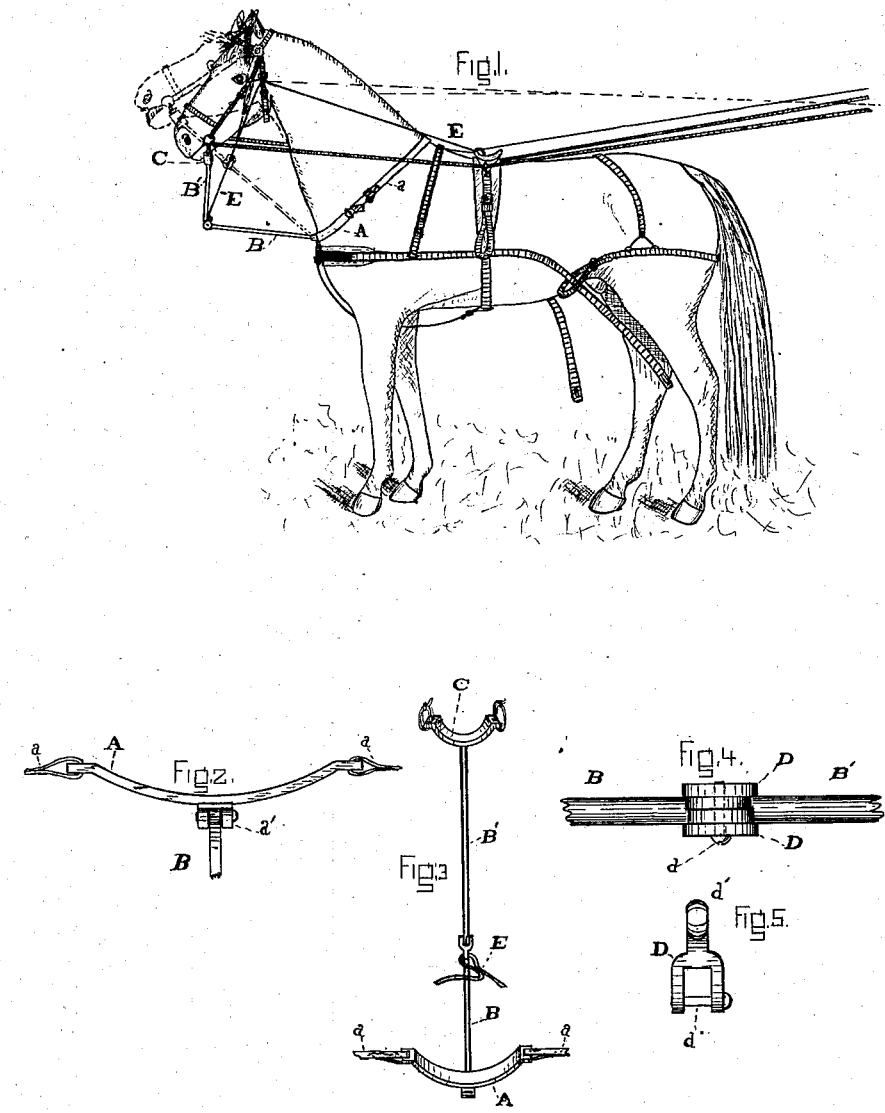

MAX ROTHSCHILD, OF CINCINNATI, OHIO.

DEVICE FOR PREVENTING HORSES FROM RUNNING AWAY.

SPECIFICATION forming part of Letters Patent No. 258,318, dated May 23, 1882.

Application filed November 7, 1881. (No model.)

*To all whom it may concern:*

Be it known that I, MAX ROTHSCHILD, of Cincinnati, Hamilton county, Ohio, have invented certain new and useful Improvements in Devices for Preventing Horses from Running Away or Kicking, of which the following is a specification.

This invention relates to devices for controlling unruly animals. Its object is a light convenient device to be attached to the horse and controlled by the driver to elevate the horse's head whenever it attempts to run away or kick, and thus check the animal from doing either.

In the accompanying drawings, Figure 1 shows my device attached to a horse. The full line shows the device relaxed as when the animal is in the natural position. The dotted line shows the toggle-jointed bars straightened by the driver to extend the animal's head and check him when he becomes unruly or pulls too hard on the bit. Fig. 2 is an enlarged view of the breast-brace. Fig. 3 is a top plan view of the device. Fig. 4 is an enlarged view of the joint looking from below; and Fig. 5 is a view of the spade-handle joint-piece, having the ring at top to receive the line by which the jointed bars are straightened.

Similar letters indicate like parts wherever they occur in the various views.

The breast-piece A, Fig. 2, is made of metal, and of a shape to snugly fit the horse's neck where the neck and breast join. It has loops at the ends to receive the straps $a$, which pass around the neck to hold piece A in place. It has also lugs $a'$ projecting from its center to receive the end of one of the jointed rods B, which is secured to it by a journal-pin passing through the lugs and an eye in the end of the bar. The bar has a square offset or shoulder, like a rule-joint, to press against the face of the plate A so as to make it press evenly against the animal when the jointed bars are straightened.

C is a curved plate of metal, with loops at each end to receive straps or snap-hooks, by which it is attached to the rings of the bridle-bit. It has also, like plate A, lugs projecting from its center, through which the end of lever-bar B' passes to receive a journal-pin which joints the end of the bar to piece C. The connecting ends of bars B B' are united by a rule-joint, the journal $d$ passing through the spade-handle D and the overlapping ends of the bars.

The check-line E passes through the ring $d'$ of the spade-handle D, thence up upon opposite sides of the horse's head, and through the ordinary check-line loops depending from the bridle-rosette, (or through friction-pulleys journaled in bearings suspended from rosette,) and from there back to the hook upon the harness-saddle, as shown in full line, Fig. 1, over which it is passed to serve as the ordinary check-line, a single line being secured to it and passing back in reach of the driver, or, as shown in dotted line, passing directly back from the rosette-loops to the driver. In either case the line will assume the position shown in dotted line when the toggle-jointed bars are straightened by the driver. The shoulder of the rule-joint connecting the bars B B' is so arranged as to prevent the bars from being drawn entirely straight, so that when the line is relaxed by the driver the bars will drop down to the position shown in full line, Fig. 1.

My device is light and no more troublesome to the animal when the lines are relaxed than the ordinary martingales, while it will, when the bars are brought to nearly a straight line, effectually check the animal.

While I regard the rosette as the best place to secure the bearing for changing the direction of the check-line E, it may be secured to a strap placed around the neck, and in some cases rings may be attached to the ends of the straps and the reins passed through them as they are now passed through the martingale-rings.

What I claim as new, and desire to secure by Letters Patent, is—

1. The combination, substantially as specified, of a bit-piece and a breast-piece attached to a horse with toggle-jointed bars connecting said pieces and a line attached to the said jointed bars for the purpose of straightening them, as set forth.

2. As a new article of manufacture, the horse-controlling device hereinbefore described, consisting of breast-piece A, bit-piece C, jointed bars B B', and joint-piece D, constructed and combined to operate as specified.

MAX ROTHSCHILD.

Witnesses:
GEO. J. MURRAY,
HORATIO V. CROLL.